United States Patent Office 3,000,221
Patented Sept. 19, 1961

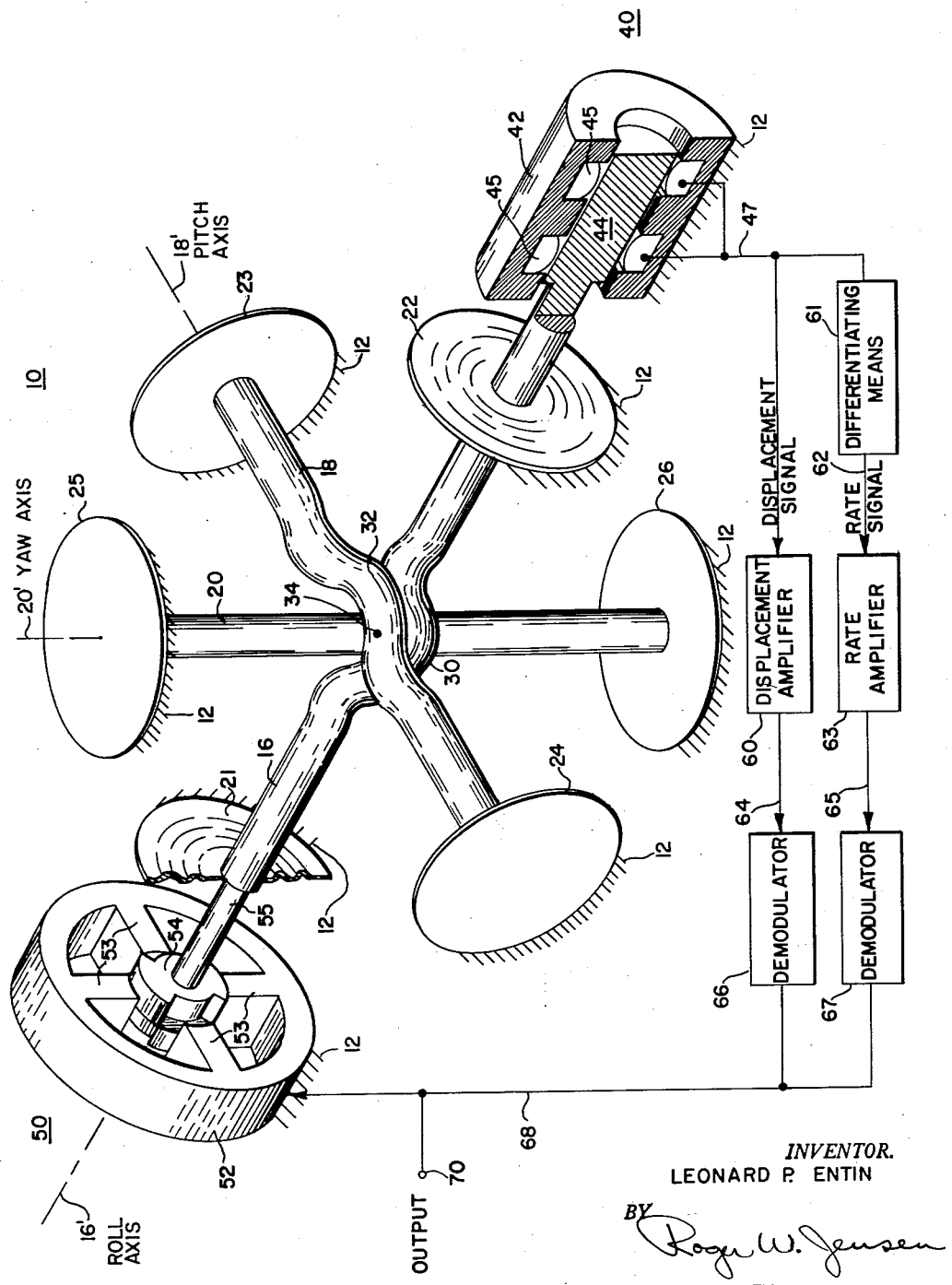

3,000,221
CONTROL APPARATUS
Leonard P. Entin, Wayland, Mass., assignor to Minneapolis-Honeywell Regulator Company, Minneapolis, Minn., a corporation of Delaware
Filed May 25, 1959, Ser. No. 815,373
7 Claims. (Cl. 73—517)

This application pertains to a specialized multi-axis accelerometer assembly characterized by its low "separation error." There have been prior art multi-axis linear accelerometers all of which have had varying degrees of difficulties with "separation errors." This "separation error" problem is especially severe in so-called "strapped-down" or gimbal-less systems where the acceleration sensing means is directly mounted on the air frame as opposed to a gimbaled system where the accelerometers are mounted in a plurality of gimbals so that air frame angular motions are not imparted thereto. In a "strapped-down" system the accelerometers must partake of severe air frame angular motions. In the prior art multi-axis accelerometers the centroids of the respective seismic masses are not space-coincident. Accordingly, for these prior art devices air frame angular motions will appear to be linear acceleration inputs and accordingly there will be outputs from the accelerometers indicative of this. These are false signals or error signals which are identified as "separation errors."

The present invention overcomes the shortcomings of the prior art multi-axis accelerometer packages by providing a unique configuration which permits the mass centroids of the individual seismic masses to coincide substantially at a single point in space, at least for one set of input acceleration conditions. This is an achievement heretofore not accomplished by the prior art devices and renders the present apparatus substantially free from the "separation error" problem.

It is an object of the present invention therefore to provide an improved control apparatus.

A further object of the invention is to provide an improved multi-axis acceleration sensor which is substantially immune from the "separation error" problem.

These and other objects of the invention will be set forth more fully and will become apparent from a reading of the following specification and appended claims, in conjunction with the accompanying drawing in which is disclosed a three-axis accelerometer in perspective view, portions of which have been omitted to facilitate a clear explanation of the invention.

In the drawing the reference numeral 10 generally depicts a three-axis accelerometer comprising in part a base means 12 which is only schematically represented by the conventionally used symbol. In the drawing a set of orthogonally arranged axes is depicted. These are shown by way of example to depict respectively the pitch, roll and yaw axes 16', 18', and 20' of a dirigible craft.

The three-axis accelerometer comprises three separate linear accelerometers, one adapted to sense acceleration for example along the roll axis 16', one to sense acceleration for example along the yaw axis 20', and one adapted to sense acceleration for example along the pitch axis 18'. In other words, the input axes of the individual linear accelerometers are mutually perpendicular.

Each of the individual linear accelerometers comprises a generally elongated member or rod-like mass element. The rod-like element for the roll axis accelerometer is identified by reference numeral 16, that for the pitch axis accelerometer by reference numeral 18, and that for the yaw axis accelerometer by the reference numeral 20. The rod-like elements 16, 18 and 20 have longitudinal axes coincident with the roll, pitch, and yaw axes 16', 18', and 20' respectively and each is individually mounted by suitable means for longitudinal movement relative to the base means 12. The present invention contemplates that the mounting means may be of any suitable type such as the non-floated, semi-floated, or fully floated types. As depicted the mounting means for the rod-like elements 16, 18 and 20 are axially flexible diaphragms which have low axial stiffness but high radial stiffness. The diaphragms supporting the rod-like element 16 are identified by reference numerals 21 and 22, those for the rod-like element 18 by the reference numerals 23 and 24, and those for the rod-like element 20 by the reference numerals 25 and 26. As shown the diaphragms are secured at their outer peripheries to the base means 12 and are secured at their inner portions by suitable means not shown specifically to the rod-like elements 16, 18 and 20. Thus the diaphragms 21—26 provide a means for supporting the individual rod-like elements for longitudinal motion relative to the base means 12.

At least two of the rod-like elements 16, 18, and 20, are characterized by having their central portions offset somewhat from the longitudinal axes thereof. As depicted the rod-like elements 16 and 18 have their central portions so modified. More specifically the rod-like element 16 has its central portion offset in a W-like configuration generally identified by the reference numeral 30 and the rod-like element 18 has its central portion offset into a W-like configuration identified by reference numeral 32. As depicted the rod-like element 20 has a straight central portion. The significance of these offset portions 30 and 32 for the rod-like elements 16 and 18 will be appreciated when it is understood that by having them the elements 16, 18 and 20 may be orthogonally arranged with the mass centroids of the individual elements 16, 18 and 20 all coinciding at substantially the same point. This point of coincidence of the mass centroids is identified in the drawing by the reference numeral 34. Thus the combination of the offset portions 30 and 32 of the elements 16 and 18 with the mounting means which orients the three elements 16, 18 and 20 orthogonally permits the three rod-like elements to be mounted so that their longitudinal axes substantially intersect and so that their mass centroids substantially coincide. With this configuration the device is substantially immune from separation errors.

The offset portions 30 and 32 as indicated have a W-like configuration. This is one of various configurations that may be used according to the teaching of the invention so as to permit the mass centroids of elements 16, 18, and 20 to lie (at least for one set of input acceleration conditions) at the common point 34. Other configurations that may be used are to have the central portion of the seismic element offset with U-like or V-like shapes. The main criterion is to have offset portions which permit the longitudinal axes to substantially intersect and which permit the mass centroids to coincide without mechanical interference between the individual accelerometers as the seismic elements move relative to the base means in response to input accelerations. As will be explained below, the actual longitudinal excursions of the seismic elements may be kept relatively low by proper design.

Means for producing a signal indicative of relative movement between the individual accelerometers and the base means 12 may be provided. Such means are only shown on the drawing as applied to the roll axis acceleration sensor but it will be understood that similar means would be provided for the other two accelerometers, these means being omitted from the drawing so as to simplify the presentation. Any suitable type of signal producing means may be provided. As shown, the signal generating means for the roll axis accelerometer is depicted as an induction pickoff generally identified by the reference numeral 40 and which comprises a stator element 42 adapted to be secured to the base means 12 by suitable means and an armature element 44 adapted to be integrally attached to the rod-like element 16. The stator element 42 has suitable winding means 45 not shown in detail. Such winding means would be characterized by having first windings adapted to be energized by an energizing signal and to have additional windings adapted to be pick-up windings which would have induced therein control voltages of a phase and magnitude indicative of the sense and magnitude of relative movement between the rod-like element 16 and the base 12. The output from the inductive pickoff 40 is provided at a pair of terminals to which is connected a lead member 47.

There may also be associated with each of the individual linear accelerometers a force producing means for causing relative motion between the rod-like elements and the base 12 upon a suitable command signal. A typical force producing means is depicted in the drawing in connection with the roll axis accelerometer including the rod-like element 16 and it will be understood that similar means may be provided if desired for both of the other accelerometers, namely the yaw axis accelerometer including the rod-like element 20 and the pitch axis accelerometer including the rod-like element 18. Such additional force producing means are not depicted so as to simplify the presentation. The force producing means for the roll axis accelerometer including the rod-like element 16 may generally be of any suitable type, the means depicted being generally the type of structure shown in the co-pending application of Leonard P. Entin and Alan M. Campbell, Serial No. 771,994, filed November 5, 1958. This force producing means is generally identified by reference numeral 50 and comprises a stator element 52 having a plurality of inwardly extending pole portions 53 upon which suitable winding means, not shown, would be provided. The force producing means 50 also includes an armature element 54 which is connected to an extension 55 of the rod-like element 16 so as to become an integral part thereof. Armature element 54 is of the crossed type shown in greater detail in the above-referenced co-pending application.

As indicated the output signal from the signal generating or producing means 40 is adapted to be transmitted by output means schematically represented by a lead 47. The signal at lead 47 is, as indicated, of a phase and magnitude indicative of the sense and magnitude of deviation of the individual rod-like element relative to the base 12. This signal is adapted to be connected to a displacement amplifier 60 and to a differentiating means 61. The output from the differentiating means 61 would be a signal indicative of the rate of change of the displacement signal and is applied through a lead 62 to a rate amplifier 63. The outputs of the displacement amplifier and rate amplifier 60 and 63 are fed respectively through suitable leads 64 and 65 to suitable demodulator means 66 and 67. The outputs of the demodulators 66 and 67 are applied to the force producing means 50 through a suitable lead 68. It will be understood that the specific details of the means connecting the signal producing means 40 to the force producing means 50 have been omitted for simplicity since they form no specific part of the invention. Any suitable means may be provided for these various elements.

Also it should be understood that the teaching of the invention may be applied to accelerometers of the "open loop" type where mechanically resilient means would be provided to bias the seismic elements 16, 18 and 20 to null-signal producing positions. An example of an "open loop" accelerometers is the device depicted in the present application drawing with the diaphragms 21—26 having a sufficient spring rate for the indicated purpose and with the force producing means 50 omitted. Generally, in both "open loop" and "closed loop" accelerometers, some means for producing a signal indicative of relative movement between the seismic mass and the base is provided. As indicated, while an electromagnetic pickoff has been disclosed, it will be understood that a wide variety of pickoffs may be used with the present invention.

*Operation*

In operation the three axis accelerometer 10 serves to sense accelerations along three orthogonal axes or in other words along three axes mutually perpendicular and passing through the same point. The present invention provides a unique configuration as described above so that the mass centroids of the individual linear accelerometers may all coincide at the same point in space, at least for one set of input acceleration conditions. For purposes of understanding the invention better an acceleration along the roll axis 16' may be assumed so as to cause relative movement between the rod-like element 16 and the base 12. The diaphragms 21 and 22 supporting the rod-like element 16 permit the element 16 to move longitudinally relative to the base 12. This relative movement will cause a relative movement between the armature 44 and the stator 42 of the signal producing means 40. This produces a signal of a phase and magnitude indicative of the sense and magnitude of original relative movement between the rod-like element 16 and the base 12. This signal is applied to the displacement amplifier 60 and also through the differentiating means 61 to the rate amplifier 63. The outputs from the amplifiers are demodulated by demodulators 66 and 67 and as indicated are applied to the force producing means 50. The sense of energization of the force producing means 50 is such that the armature element 54 will transmit to the rod-like element 16 a force tending to oppose the initial force which causes the relative movement between the elements 16 and the base 12. Thus there is provided a force rebalance mode of operation for the accelerometer. By using this "closed loop" type of operation the actual excursion of the mass centroid of the individual rod-like element away from its neutral position may be kept very low. Further, the amount of signal applied to the force producing means 50 is indicative of the actual acceleration sensed by the individual linear accelerometer. This signal to the force producing means may be measured at a suitable output terminal 70 for use in additional control apparatus, not shown.

As explained above if desired each of the individual linear accelerometers would have signal producing means and if desired force producing means associated with it so as to provide the same functions as is depicted in connection with the accelerometer including the rod-like element 16. It will be understood that the three-axis accelerometer package generally identified by the reference numeral 10 may simultaneously sense accelerations along three orthogonal axes which may be the pitch, roll, and yaw axes of a dirigible craft. Due to the unique offset arrangement in the central portions of at least two of the linear accelerometers the mass centroids may all be oriented so as to coincide at the single point 34 in space.

In some modes of operation it may be desired only to sense accelerations in two axes. In this case only two linear accelerometers are needed, one of which may have a straight shank portion while the other would have an offset portion so that the mass centroids would also coincide at the same point in space.

While I have shown and described a specific embodiment of my invention, further modifications and improvements will occur to those skilled in the art. I desire it to be understood, therefore, that this invention is not limited to the particular form shown and I intend in the appended

What I claim is:

1. Apparatus for sensing accelerations along first, second, and third mutually perpendicular intersecting axes, said apparatus comprising: base means; three rod-like members each having a longitudinal axis and at least two of which have offset central portions; means for mounting said members orthogonally on said base means for movement relative thereto, said mounting means positioning said members so that the longitudinal axes thereof are respectively substantially coincident with said first, second, and third mutually perpendicular intersecting axes, so that said offset central portions are separated from one another and so that the mass centroids of said members coincide at substantially the same point for at least one set of input acceleration conditions; pickoff means associated with each member for producing a signal indicative of relative movement between its member and said base; force producing means associated with each member adapted when actuated to cause movement between its member and said base; and means connecting the pickoff means and the force producing means associated with each member.

2. Apparatus for sensing accelerations along first, second, and third mutually perpendicular intersecting axes, said apparatus comprising: base means; three rod-like mass members each having a longitudinal axis and at least two of which have offset central portions; means for individually mounting said mass members orthogonally on said base means for movement relative thereto, said offset portion permitting said mounting means to position said members so that the longitudinal axes thereof are respectively substantially coincident with said first, second, and third mutually perpendicular intersecting axes, and so that the mass centroids of said mass members coincide at substantially the same point for at least one set of input acceleration conditions; pickoff means associated with each mass member for producing a signal indicative of relative movement between its member and said base; force producing means associated with each mass member adapted when actuated to cause movement between its member and said base; and means connecting the pickoff means and the force producing means associated with each mass member.

3. Apparatus for sensing accelerations along first and second mutually perpendicular intersecting axes, said apparatus comprising: base means; first and second rod-like members each having a longitudinal axis and at least one of which has an offset central portion; means for mounting said members on said base means for longitudinal movement relative thereto, said offset portion permitting said mounting means to position said members so that the longitudinal axes thereof are respectively substantially coincident with said first and second perpendicular intersecting axes, so that said members are separated from one another, and so that the mass centroids of said members coincide at substantially the same point for at least one set of input acceleration conditions; pickoff means associated with each member for producing a signal indicative of relative movement between its member and said base; force producing means associated with each member adapted when actuated to cause movement between its member and said base; and means connecting the pickoff means and the force producing means associated with each member.

4. Apparatus for sensing accelerations along first and second perpendicular intersecting axes, said apparatus comprising: base means; first and second mass members each having a longitudinal axis and at least one of which has an offset central portion; and means for individually mounting said mass members on said base means for longitudinal movement relative thereto, said offset portion permitting said mounting means to position said mass members so that the longitudinal axes thereof are respectively substantially coincident with said first and second perpendicular intersecting axes, and so that the mass centroids of said mass members coincide at substantially the same point for at least one set of input acceleration conditions.

5. In a multi-axis accelerometer: a base, three elongated members, at least two of which have central portions thereof offset from their respective longitudinal axes, and each of said members being characterized by its mass centroid lying substantially on its longitudinal axis; mounting means for each member for individually mounting said members for movement relative to said base along their respective longitudinal axes, said offset portions permitting said mounting means to position said members orthogonally relative to one another and so that said mass centroids of said members substantially coincide; and pickoff means associated with each member for producing a signal indicative of relative movement between each of said members and said base.

6. Apparatus for sensing accelerations along first and second perpendicular intersecting axes comprising: base means; first and second elongated members each having a longitudinal axis; means for individually mounting said members on said base means so that the longitudinal axes of said members are respectively substantially coincident with said intersecting axes and so that the mass centroids of said members substantially coincide for one set of input acceleration conditions.

7. Apparatus for sensing accelerations along first and second intersecting axes comprising: base means; first and second members each having an axis passing through the mass centroid thereof; means for individually mounting said members on said base means so that said axes thereof are respectively substantially coincident with said intersecting axes and so that said mass centroids substantially coincide for one set of input acceleration conditions.

References Cited in the file of this patent
UNITED STATES PATENTS

| | | |
|---|---|---|
| 2,570,672 | Hathaway | Oct. 9, 1951 |
| 2,695,165 | Hansen | Nov. 23, 1954 |
| 2,856,240 | Breazeale et al. | Oct. 14, 1958 |